United States Patent [19]

Gershon

[11] 3,940,032

[45] Feb. 24, 1976

[54] ROLLING DIAPHRAGMS FOR EXPELLING LIQUIDS

[75] Inventor: Milton Gershon, Morristown, N.J.

[73] Assignee: Thiokol Corporation, Newtown, Pa.

[22] Filed: Dec. 16, 1966

[21] Appl. No.: 602,421

[52] U.S. Cl. ............................................. 222/386.5
[51] Int. Cl.² ............................................. B67D 5/04
[58] Field of Search .......... 222/95, 386.5; 158/50.1; 239/323

[56] References Cited
UNITED STATES PATENTS 3,471,349  10/1969  Cohen et al. ..................... 222/386.5

*Primary Examiner*—Verlin R. Pendegrass

[57] ABSTRACT

The disclosure relates to a rolling cylindrical diaphragm having one end connected to the peripheral wall of a tank and its opposite end connected to the periphery of a piston for expelling a liquid, such as a propellant for a rocket engine, and more especially to a construction in which the diaphragm is tack welded at spaced points around its periphery to weakened sections of a lining in the tank so that the diaphragm will tear the weakened sections from the remainder of the lining to prevent radial collapse of the diaphragm and control its longitudinal movement along the tank when an activating pressure fluid is applied to one side thereof.

8 Claims, 3 Drawing Figures

INVENTOR.
MILTON GERSHON
BY
Curtis, Morris & Safford
ATTORNEYS

ROLLING DIAPHRAGMS FOR EXPELLING LIQUIDS

The present invention relates to tanks for storing liquids and more particularly to improvements in "rolling diaphragms" for positively expelling liquid therefrom.

Rolling diaphragms have heretofore been used to expel liquid from a tank and comprise a sleeve of flexible material having one end attached to the wall of the tank around its periphery and its opposite end connected to a piston. A motive fluid applied between the piston and end of the tank actuates the piston toward the opposite end of the tank and causes the diaphragm to roll back on itself. Thus, the piston and diaphragm displace the liquid in the tank and expel it through an outlet port at the end of the tank opposite the piston.

Such rolling diaphragms are particularly adapted for use in expelling a propellant from a storage tank to the combustion chamber in a power plant for a rocket engine. However, such rolling diaphragms as previously used are subjected to the pressure of the motive fluid around the entire periphery and are apt to buckle radially inward if the length or diameter of the diaphragm exceeds particular limits for any particular wall thickness. To avoid such radial buckling, it has heretofore been proposed to adhesively attach the rolling diaphragm to the surrounding tank wall with a material which will resist peeling until a pressure is applied which will actuate the piston, but will peel at a pressure less than that which would produce rupture of the diaphragm sleeve. However, the requirements for particular installations may vary the pressure at which the diaphragm is rolled so that different adhesive material have to be used for different designs.

One of the objects of the present invention is to provide an improved construction for attaching a diaphragm sleeve to a surrounding wall which permits diaphragms of larger size to be used without danger of radial buckling.

Another object is to attach a diaphragm sleeve to a surrounding wall in a storage tank at a plurality of spaced locations uniformly over the entire surface to resist radial buckling but permit the diaphragm sleeve to peel away from the surrounding wall as the diaphragm rolls back on itself.

Still another object is to provide a diaphragm sleeve of the type indicated which is of relatively simple and compact construction to adapt it for economical manufacture and one which is reliable in operation in performing its intended function.

These and other objects will become more apparent from the following description and drawing in which like reference characters denote like parts throughout the several views. It is to be expressly understood, however, that the drawing is for the purpose of illustration only and is not a definition of the limits of the invention, reference being had for this purpose to the appended claims.

IN THE DRAWING

Figure 1:
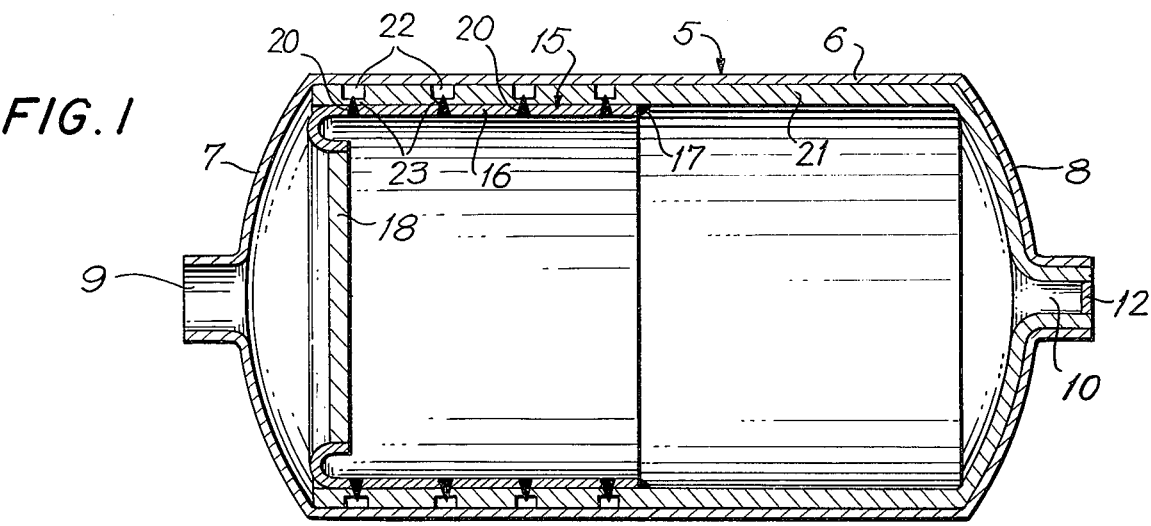
FIG. 1 is a longitudinal sectional view of a tank incorporating the improved rolling diaphragm construction of the present invention and showing the wall of the diaphragm attached to a surrounding wall in the tank by a plurality of spot welds.

Referring now to the drawing, the invention is shown applied to a tank 5 having a cylindrical wall 6 and end walls 7 and 8, but it will be understood that the tank may have other constructions, such as an annular form concentric with the axis of a rocket engine. The end wall 7 has an inlet port 9 through which a motive fluid, such as gas from a gas generator, is supplied and the end wall 8 has an outlet port 10 through which liquid is expelled. The outlet 10 is sealed by a burst disc 12 which is ruptured when a predetermined pressure is applied or by other appropriate sealing means.

Figure 2:
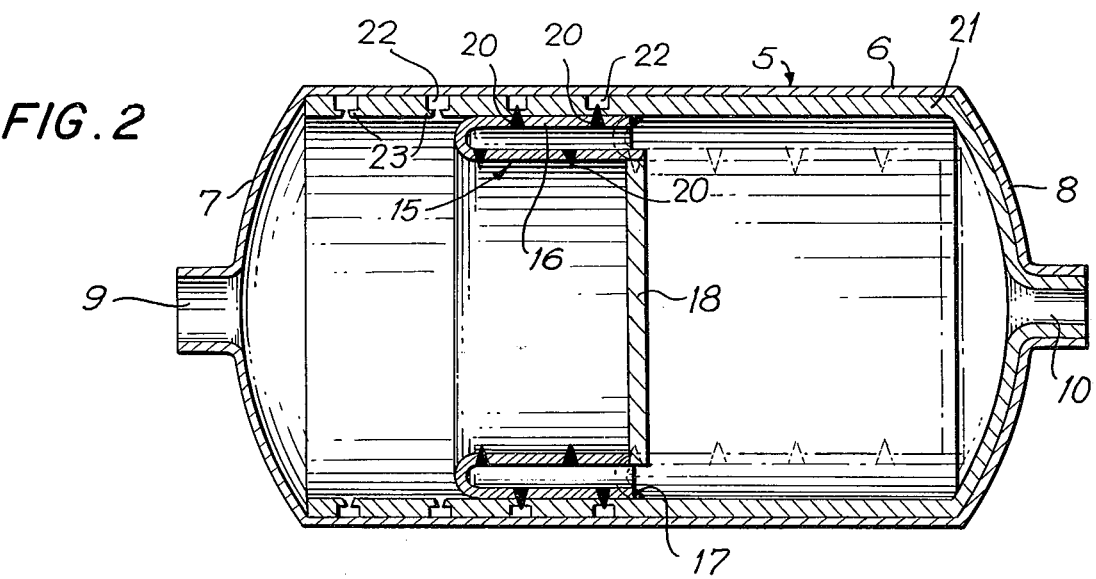
FIG. 2 is a view similar to FIG. 1 showing the diaphragm partially rolled and the spot welds pulled from breakaway areas of the surrounding wall as the diaphragm rolls.

Mounted in the tank 5 is a rolling diaphragm 15 having a cylindrical sleeve 16 closely fitting the cylindrical wall of the tank and extending through substantially one-half of its length. One end of the diaphragm sleeve 16 is attached to the interior of a surrounding wall 21 by a peripheral weld 17, and the opposite end of the diaphragm sleeve is attached to the periphery of a piston 18. The diaphragm sleeve 16 is made of a flexible material, such as a thin gauge aluminum, and when a motive fluid is supplied through the inlet port 9 at a sufficient pressure, the diaphragm sleeve 16 yields and rolls back on itself, or inside-out, from one end of the tank 5 to the other as illustrated in FIG. 2. The piston 18 and rolled diaphragm 15 then displace the liquid in the tank 5 and expel it through the outlet port 10. Upon initial application of the motive fluid, pressure is transmitted through the piston 18 and liquid stored in the tank 5 to rupture the sealing disc 12 in the outlet port 10 after which the liquid is discharged therethrough. As thus far described the tank 5 and rolling diaphragm 15 are substantially identical with those previously known and used.

In accordance with the present invention the cylindrical sleeve 16 of the diaphragm 15 is attached to the surrounding wall 21 in the tank at a plurality of prearranged locations by means of spot welds 20 of a number and spacing to resist radial buckling. Furthermore, each weld is so constructed as to peel away from its surrounding wall 21 without tearing the diaphragm sleeve while at the same time providing sufficient resistance to prevent radial buckling.

In the particular embodiment of the invention illustrated in the drawing, the spot welds 20 between the diaphragm sleeve 16 and surrounding wall 21 in the tank 5 are located at particular areas having less resistance to tearing than the corresponding welded areas of the diaphragm wall. To this end, the surrounding wall 21 in the tank is a lining extending over the inner surface of the tank wall 6. Lining 21 may be inserted into the tank 5 before the end wall 7 is connected to the cylindrical wall 6 and be unattached thereto, or the lining may be attached to the surrounding wall as by welding, brazing or soldering. In this way the outer wall 6 of the tank 5 may be constructed of a material of thin gauge having the strength required, such as high strength steel, which may be incompatible with the liquid being stored. The lining 21, on the other hand, may be made of a material compatible with the liquid being stored, but having less strength and a much lower yield point than the steel, such as aluminum. At the location of each of the spot welds 20 the lining 21 has a recess 22 to provide a local thin section 23 to which the spot weld 20 is attached. Each of the thin sections 23 may be made thinner than the material of the diaphragm sleeve 16, or may be composed of a material having a yield point less than the material of the diaphragm sleeve, so that when a destructive force is applied across the weld the disc 23 will tear out of the lining without rupturing the sleeve 16.

The number of spot welds 20 and their location is such that the total additive resistance of the thin sections section 23 in the lining 21 will resist the inward buckling force applied radially on the diaphragm sleeve 16 at the particular pressure of the motive fluid supplied to cause rolling of the diaphragm. Thus, the spot welds 20 prevent collapse of the rolling diaphragm sleeve 16 until the piston 18 starts to move and the cylindrical sleeve of the diaphragm starts to roll from the position shown in FIG. 1 to that shown in FIG. 2. However, the thin sections 23 of the lining 21 to which the spot welds 20 are attached have a thickness and resistance to rupture which will yield upon application of a force less than that required to rupture the diaphragm sleeve 16 so that the welds 20 pull out the thin sections 23 as the diaphragm 16 rolls back and peels away from the lining 21. It will be understood that the diaphragm sleeve 16 and lining 21 may be designed for any radial buckling and rolling load conditions by varying the thickness of the thin breakaway sections 23 formed by the recesses 24 in the lining 21 and by varying the number of spot welds 20 and their particular location. The diaphragm sleeve 16 and lining 21 may be made of different materials, or alloys of the same material such as 1100-0 aluminum and 2014-T6 aluminum, or of the same material with heat treatment of one of the parts.

Figure 3:
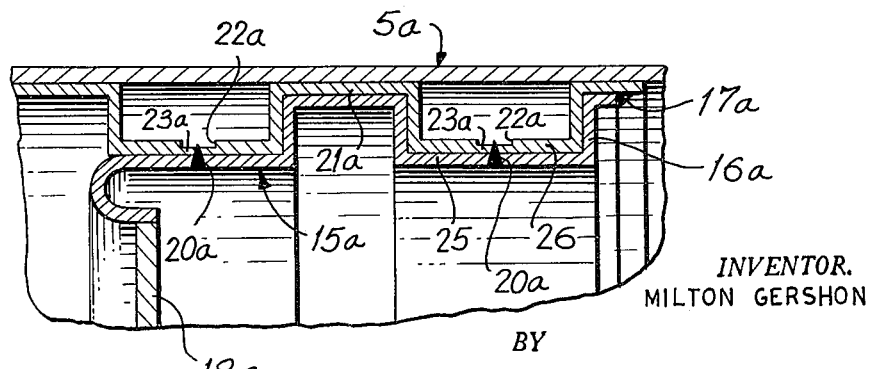
FIG. 3 is a sectional view of a portion of a wall in a tank to which the diaphragm is spot welded and having a modified construction to further resist radial buckling.

FIG. 3 illustrates a modified construction in which the surrounding wall or lining 21a has at least one corrugation 26 between its attached end and the piston 18a to increase its resistance to radial buckling. Preferably, the diaphragm 15a also is of corrugated shape having a corrugation 25 adjacent to and abutting the corrugation 26. The corrugation 26 in the lining 21a has recesses 22a, and the corrugations 25 and 26 are attached by the spot welds 20a the same as in FIG. 1. The open end of the diaphragm sleeve 15a is attached to the lining 21a by a peripheral weld 17a.

The modified construction illustrated in FIG. 3 operates in substantially the same way as described above with respect to the construction illustrated in FIGS. 1 and 2 in that a motive fluid acting on piston 18a to cause rolling of diaphragm sleeve 16a will not produce a radial buckling, due to the plurality of spot welds 20, but will ultimately yield and tear away the thin sections 23a as the diaphragm rolls and peels away from the lining 21a, the same as in FIGS. 1 and 2.

It will now be observed that the present invention provides an improved construction of rolling diaphragm which permits their use on tanks of larger sizes without danger of lateral buckling. It will also be observed that the present invention provides a spot welded construction for attaching a rolling diaphragm sleeve to a tank wall which resists radial buckling but permits the diaphragm to peel away from the tank wall as it rolls back on itself. It will still further be observed that the present invention provides a rolling diaphragm of improved construction which is of relatively simple and compact construction to adapt it for economical manufacture and one which is reliable in operation.

While two embodiments of the invention are herein illustrated and described, it will be understood that further changes may be made in the construction and arrangement of elements without departing from the spirit or scope of the invention. Therefore, without limitation in this respect the invention is defined by the following claims.

I claim:

1. In a tank for storing liquids having a rolling diaphragm for positively expelling liquid of the type comprising a sleeve conforming to the contour of a surrounding wall of the tank with one end attached thereto and its opposite end attached to a piston and which rolls back on itself upon the application of a pressurizing fluid against the piston to expel liquid from the tank, that improvement which comprises attaching the sleeve of the rolling diaphragm to a surrounding wall by a plurality of spot welds constructed to tear loose from the surrounding wall and of a number and spaced arrangement to resist radial buckling and release successively during rolling of the diaphragm sleeve.

2. A rolling diaphragm for positively expelling liquid from a tank comprising a diaphragm sleeve having one end attached to a surrounding wall to form a seal therebetween, a piston connected to the opposite end of the sleeve, a plurality of spot welds between said diaphragm sleeve and surrounding wall and so located as to resist radial buckling of the sleeve by the application of fluid pressure on the piston sufficient to roll the diaphragm back on itself to positively expel the liquid from the tank, and each of said welds having a construction to break away from the surrounding wall at a pressure less than that which will tear the diaphragm sleeve so that the latter will peel away from the surrounding wall as it rolls.

3. A rolling diaphragm for positively expelling liquid from a tank comprising a lining in said tank, a diaphragm sleeve of a flexible material in said tank and having a contour conforming to said lining, a piston at one end of said diaphragm sleeve, the opposite end of said diaphragm sleeve being permanently attached to said lining, a plurality of spot welds between said diaphragm sleeve and tank lining of sufficient number and so located as to resist radial buckling of the sleeve by the application of fluid pressure on the piston sufficient to roll the diaphragm back on itself to positively expel the liquid from the tank, and said tank lining, at least at the location of the welds, having less resistance to tearing than the diaphragm sleeve so that the latter will peel away from the lining as it rolls.

4. A rolling diaphragm in accordance with claim 3 in which the lining comprises a thin wall of a different material than the material of the tank and which is compatible with the liquid being stored whereby to adapt the tank to be constructed of a material having a greater strength than the material of the lining.

5. A rolling diaphragm in accordance with claim 3 in which the lining has recesses at the location of the spot welds to provide a thin section of lining which will tear out as the diaphragm rolls back on itself.

6. A rolling diaphragm in accordance with claim 4 in which the lining extends over the entire surface of the interior of the tank, the diaphragm sleeve extends through substantially one-half the length of the tank with one end attached to the lining around its entire periphery, a piston attached to the opposite end of the sleeve, a plurality of rows of peripherally spaced spot welds between the diaphragm sleeve and lining, and the lining having said recesses arranged to provide a thin pull-out section around each weld to cause the diaphragm to peel away from the lining as it rolls.

7. A rolling diaphragm in accordance with claim 3 in which the lining is corrugated to increase its resistance to radial buckling.

8. A rolling diaphragm in accordance with claim 7 in which the diaphragm sleeve is corrugated to correspond with the lining, and the spot welds being located between the sleeve and lining at the inwardly projecting corrugations.

* * * * *